United States Patent
Sasaki et al.

(10) Patent No.: US 6,334,426 B1
(45) Date of Patent: Jan. 1, 2002

(54) DIRECT FUEL INJECTION-TYPE SPARK-IGNITION INTERNAL COMBUSTION ENGINE

(75) Inventors: Kouichi Sasaki, Toyota; Shizuo Abe, Aichi-ken; Fumikazu Satou, Toyota; Sigemitu Iisaka, Shizuoka-ken; Makoto Koike; Yoshihiro Nomura, both of Aichi, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/524,273

(22) Filed: Mar. 13, 2000

(30) Foreign Application Priority Data

Mar. 16, 1999 (JP) .......................... 11-070035

(51) Int. Cl.[7] ................................. F02B 3/00
(52) U.S. Cl. ..................................... 123/298
(58) Field of Search ............... 123/294, 295, 123/305, 298

(56) References Cited

U.S. PATENT DOCUMENTS 4,473,046 A * 9/1984 Ayoama et al. ............. 123/294
5,806,482 A * 9/1998 Igarashi et al. ............. 123/295
6,186,113 B1 * 2/2001 Hattori et al. .............. 123/305

FOREIGN PATENT DOCUMENTS

| EP | 0 519 275 A1 | 12/1992 |
| EP | 0 778 403 A1 | 6/1997 |
| EP | 0 945 603 A2 | 9/1999 |
| EP | 0 971 109 A1 | 1/2000 |
| JP | A 4-237822 | 8/1992 |
| JP | A 9-158736 | 6/1997 |
| JP | A-9-158736 | 6/1997 |

* cited by examiner

Primary Examiner—John Kwon
(74) Attorney, Agent, or Firm—Oliff & Berridge PLC

(57) ABSTRACT

A direct fuel injection-type spark-ignition internal combustion engine is disclosed. The engine comprises a spark plug, a cavity formed on the top surface of the piston, and a fuel injection valve for injecting fuel into the cavity in nearly the flat fan shape having a relatively small thickness. An opposing side wall of the cavity opposite to the fuel injection valve, for leading the fuel to the vicinity of the spark plug, has an arcuate portion having a plurality of arcuate shapes in a plan view. The radius of arcuate shape at the both side parts of the arcuate portion in a plan view is smaller than the radius of arcuate shape at the center part of the arcuate portion in a plan view. The opposing side wall has a deflecting portion to deflect the fuel toward the inside of the cavity.

9 Claims, 3 Drawing Sheets

DIRECT FUEL INJECTION-TYPE SPARK-IGNITION INTERNAL COMBUSTION ENGINE

BACKGROUND OF THE INVENTION

1. Field of the Invention

The present invention relates to a direct fuel injection-type spark-ignition internal combustion engine.

2. Description of the Related Art

There has heretofore been known a stratified charge combustion produced by directly injecting fuel into a cylinder to form a mixture (hereinafter referred to as a combustible mixture) that can be favorably ignited only in the vicinity of a spark plug, at the ignition timing, to burn a lean mixture in the cylinder as a whole. To carry out the stratified charge combustion, in general, the fuel injection valve injects fuel in the latter half of the compression stroke. It is intended that the thus injected fuel proceeds into a concave combustion chamber formed in the top surface of the piston, is vaporized by robbing heat from the high-temperature air and the wall surfaces of the combustion chamber, is deflected by the shape of the combustion chamber toward the spark plug, and forms a combustible mixture near the spark plug.

In general, the fuel injection valve injects fuel in a shape that is conically concentrated. Therefore, a relatively long period is required while the fuel injected in the last stage of fuel injection becomes a combustible mixture utilizing the heat from the wall surfaces of the combustion chamber. To ensure this period, therefore, the fuel injection end timing must be advanced. An amount of fuel which can be injected in the latter half of the compression stroke, therefore, inevitably decreases, and stratified charge combustion must be abandoned in high engine load operations in which a relatively large amount of fuel is required. It has therefore been desired to carry out the stratified charge combustion, which is effective in decreasing the consumption of fuel, over a wider range of engine operations.

Japanese Unexamined Patent Publication (Kokai) No. 9-158736 proposes injecting the fuel in the shape of a flat fan having a relatively small thickness by using a fuel injection valve having an injection hole in the shape of a slit. The thus injected fuel can rob heat from a wide area of the wall surfaces of the combustion chamber, making it possible to form a combustible mixture within a short period and to retard the timing for ending the injection of fuel. Thus, it is expected to increase an amount of injected fuel in the latter half of the compression stroke and to expand the range of the stratified charge combustion toward the high engine load side.

In the above prior art, fuel injected in a fan shape proceeds radially spreading along the bottom wall of the combustion chamber within a contained angle of the fan. At this time, all the parts of fuel in the direction of width thereof have velocity vectors along the bottom wall of the combustion chamber and maintain a radial relationship relative to each other. Thereafter, all the parts of fuel arrive at the side wall of the combustion chamber opposite to the fuel injection valve, and proceed along the opposing side wall. In general, the opposing side wall of the combustion chamber has an arcuate shape in a plan view and establishes such a positional relationship that the center of the contained angle of the fan of fuel is separated more than the center of the arcuate shape from the opposing side wall of the combustion chamber. When the fuel proceeds along the opposing side wall, therefore, the velocity vector of each part of fuel in the direction of width thereof is converted into a synthesized velocity vector of the upward velocity vector and the horizontal velocity vector directed to the center of the opposing side wall. It is thus intended to direct all parts of fuel toward the spark plug.

When the arcuate shape selected on the opposing side wall of the combustion chamber has a relatively small radius, the angle of collision of each part of fuel on the opposing side wall generally becomes small in a plan view. Therefore, the horizontal velocity vector generally increases in all parts of fuel. Particularly, fuel parts proceeding along the central portion of the opposing side wall would have already passed the vicinity of the spark plug at the ignition timing since the horizontal distance to the spark plug is relatively short.

When the radius of the arcuate shape is selected to be relatively large, on the other hand, the horizontal velocity vectors of all parts of fuel generally become small. Particularly, fuel parts proceeding along both sides of the opposing side wall have not yet been arrived in the vicinity of the spark plug at the ignition timing since the horizontal distance to the spark plug is relatively long. Thus, even when the opposing side wall of the combustion chamber is simply formed in an arcuate shape in a plan view, all parts of the fan-shaped fuel spray can not be concentrated near the spark plug at the ignition timing as intended. In the stratified charge combustion, therefore, the mixture formed near the spark plug becomes lean and a misfire can occur.

SUMMARY OF THE INVENTION

It is therefore an object of the present invention to reliably prevent a misfire in the stratified charge combustion in a direct fuel injection-type spark-ignition internal combustion engine in which fuel is injected in a nearly flat fan shape having a relatively small thickness.

According to the present invention, there is provided a direct fuel injection-type spark-ignition internal combustion engine comprising a spark plug, a cavity formed on the top surface of the piston, and a fuel injection valve for injecting fuel into the cavity in nearly a flat fan shape having a relatively small thickness, wherein an opposing side wall of the cavity opposed to the fuel injection valve, for leading the fuel to the vicinity of the spark plug, has an arcuate portion having a plurality of arcuate shapes in a plan view, the radius of the arcuate shape at both side parts of the arcuate portion in a plan view is smaller than the radius of arcuate shape at the center part of the arcuate portion in a plan view, and the opposing side wall has a deflecting portion to deflect the fuel toward the inside of the cavity.

The present invention will be more fully understood from the description of preferred embodiments of the invention set forth below, together with the accompanying drawings.

DESCRIPTION OF THE PREFERRED EMBODIMENTS

Figure 1:
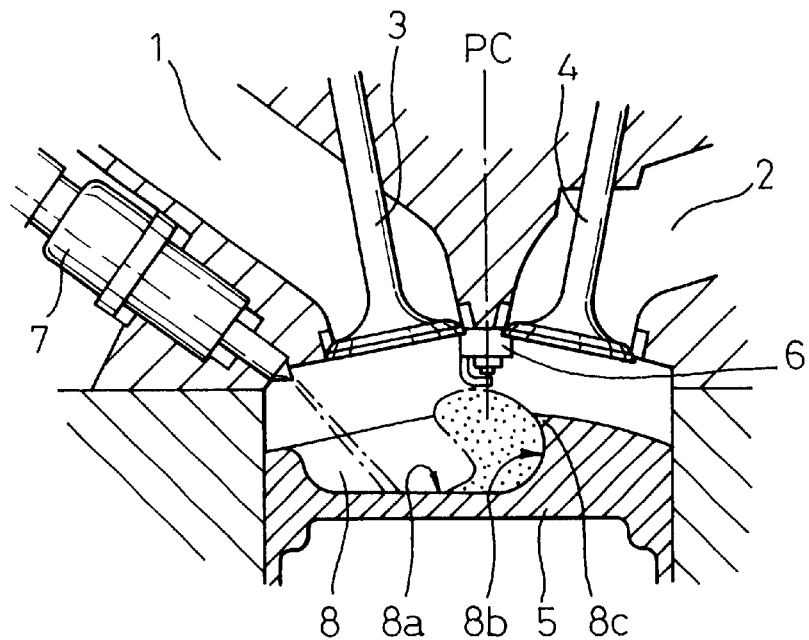
FIG. 1 is a vertical sectional view schematically illustrating a direct fuel injection-type spark-ignition internal combustion engine according to an embodiment of the present invention.
Figure 2:
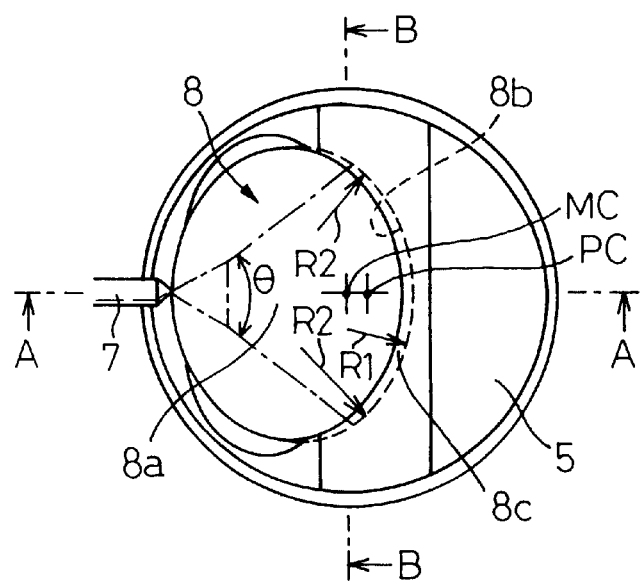
FIG. 2 is a plan view of a piston of FIG. 1.

FIG. 1 is a vertical sectional view schematically illustrating a direct fuel injection-type spark-ignition internal combustion engine according to a first embodiment of the present invention, and FIG. 2 is a plan view of a piston in FIG. 1. In these drawings, reference numeral 1 denotes an intake port and 2 denotes an exhaust port. The intake port 1 is communicated with the cylinder via an intake valve 3, and the exhaust port 2 is communicated with the cylinder via an exhaust valve 4. Reference numeral 5 denotes a piston, and 6 denotes a spark plug arranged in nearly the central of the upper wall of the cylinder. A fuel injection valve 7 injects fuel in nearly a flat fan shape having a relatively small thickness.

For example, in a uniform charge combustion region where a high engine output is required, the fuel injection valve 7 injects a required amount of fuel in the intake stroke thereby to form a uniform charge mixture in the cylinder at the ignition timing. On the other hand, in a stratified charge combustion region, the fuel injection valve 7 injects a required amount of fuel in the latter half of the compression stroke. As shown in FIG. 1, fuel injected in the latter half of the compression stroke enters into a concave cavity 8 formed in the top surface of the piston 5, and collides with the bottom wall 8a of the cavity 8. Thereafter, fuel proceeds toward the opposing side wall 8b of the cavity 8 opposed to the fuel injection valve 7 while radially spreading and gradually vaporizing along the bottom wall 8a within an included angle θ of the fan of fuel. At this time, all parts of fuel possesses velocity vectors along the bottom wall 8a and maintain a radial relationship relative to one another.

The opposing side wall 8b of the cavity 8 has an arcuate portion having a plurality of arcuate shapes in a plan view. In the arcuate portion, the radius R2 of the arcuate shape at both side parts in a plan view is smaller than the radius R1 of the arcuate shape at the central part in a plan view. The connection portions between different radii of arcuate shapes are made smooth. In a plan view, further, the centers of radii RI and R2 of the arcuate shapes are separately positioned on the center line of the contained angle of the fan of fuel, establishing such a relationship that the center of the contained angle of the fan of fuel is separated more, than these centers of radii R1 and R2, from the opposing side wall 8b. Thus, the opposing side wall 8b has the arcuate portion, and the bottom wall 8a and the opposing side wall 8b of the cavity 8 are smoothly connected together in the vertical direction by an arcuate shape and the like. Accordingly, when all parts of fuel arrive at the opposing side wall 8b and proceed along the opposing side wall 8b, the velocity vector of each part of fuel is converted into a synthesized velocity vector of the upward velocity vector and the horizontal velocity vector directed to the center of the opposing side wall 8b. Further, the opposing side wall 8b has a deflecting portion 8c, so that all parts of fuel proceeding along the opposing side wall 8b are deflected toward the inside of the cavity 8.

Figure 3:
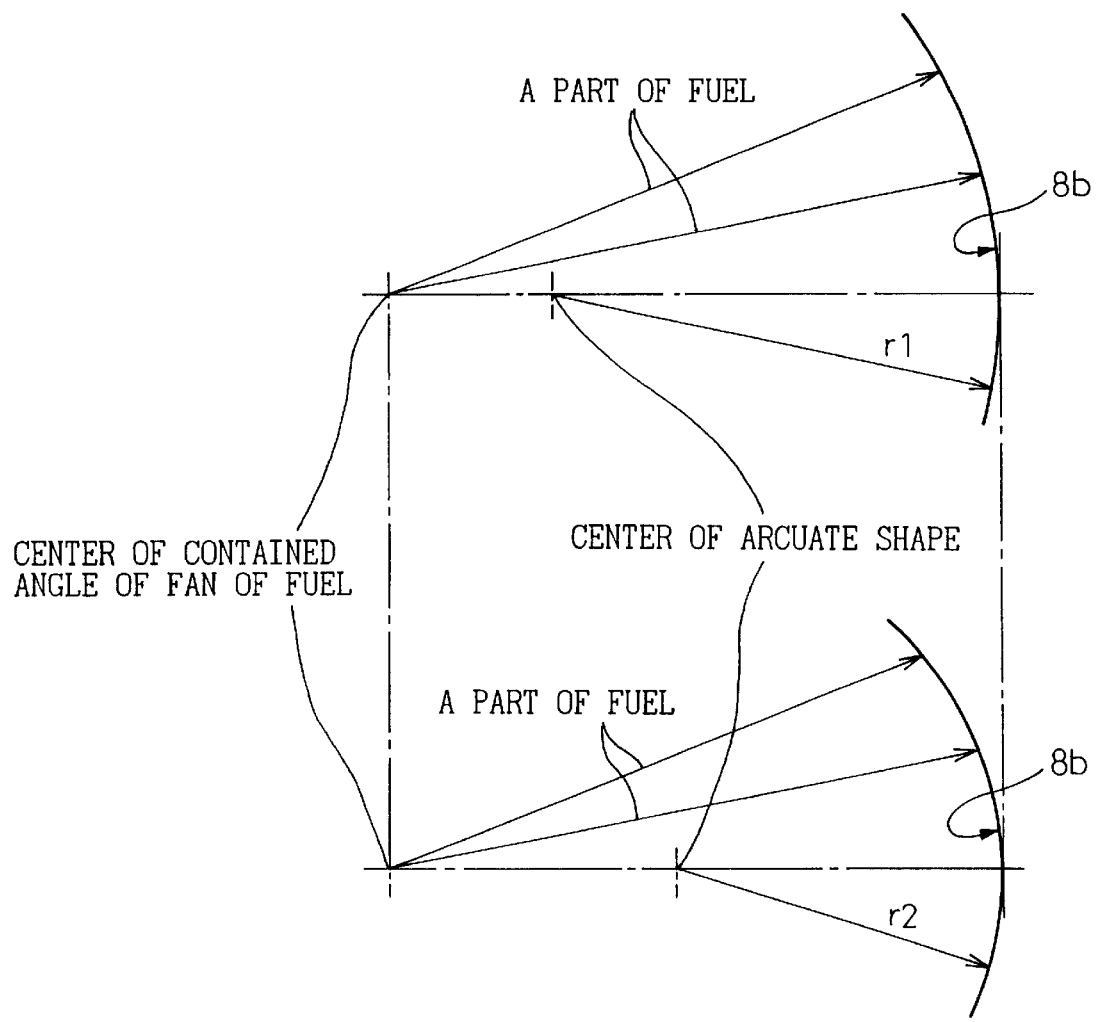
FIG. 3 is a view illustrating a relationship between the radius of arcuate shape of an opposing side wall of a cavity and the angle of collision of the fuel.

In the arcuate portion of the opposing side wall 8b, if both side portions and the central portion have the same radius r1 of the arcuate shape which is relatively large, all parts of fuel proceeding on the bottom wall 8a of the cavity 8 generally come into collision with the opposing side wall 8b of the cavity 8 at an acute angle which is relatively large as shown on the upper side in FIG. 3, and the horizontal velocity vectors become relatively small when converted. Accordingly, the part of fuel proceeding along the central part of the opposing side wall 8b having a short horizontal distance to the spark plug 6, arrives at the vicinity of the spark plug 6 at the ignition timing. However, the parts of fuel proceeding along both side portions of the opposing side wall 8b having a long horizontal distance to the spark plug 6, have not arrived at the vicinity of the spark plug 6 at the ignition timing.

In the arcuate portion of the opposing side wall 8b, on the other hand, if both side portions and the central portion have the same radius r2 of arcuate shape which is relatively small, all parts of fuel proceeding on the bottom wall 8a of the cavity 8 generally comes into collision with the opposing side wall 8b of the cavity 8 at an acute angle which is relatively small as shown on the lower side in FIG. 3, and the horizontal velocity vectors become relatively large when converted. Therefore, the parts of fuel proceeding along both side portions of the opposing side wall 8b arrive at the vicinity of the spark plug 6 at the ignition timing. However, the part of fuel proceeding along the central portion of the opposing side wall 8b has already passed the vicinity of the spark plug 6 at the ignition timing.

In this embodiment, on the other hand, the opposing side wall 8b of the cavity 8 has the arcuate portion having a plurality of arcuate shapes in a plan view, and the radius R2 of the arcuate shape on both side parts in a plan view is smaller than the radius R1 of arcuate shape of the central part in a plan view. Therefore, the parts of fuel proceeding along both side portions of the opposing side wall 8b have relatively large horizontal velocity vectors when converted, and the parts of fuel proceeding along the central portion of the opposing side wall 8b have relatively small horizontal velocity vectors when converted. Accordingly, all parts of fuel can arrive at the vicinity of the spark plug 6 at the ignition timing.

However, when all parts of fuel are deflected by the deflecting portion 8c toward the inside of the cavity 8 at the same angle, the horizontal distance to the spark plug 6 differs depending on the central portion and both side portions of the opposing side wall 8b, and thus, though all parts of fuel can arrive at near one point in the horizontal direction at the ignition timing, the height differs depending upon the parts of fuel. For example, all parts of fuel can be concentrated nearly in a cylindrical form about a vertical line MC shown in FIG. 2. The thus formed mixture is not so lean as to deteriorate the ignition performance, and comes in contact with the ignition gap of the ignition plug 6, realizing favorable stratified charge combustion without a misfire.

It is further possible to bring the vertical line MC, about which the fuel is concentrated, into agreement with the center line PC of the spark plug, so that the formed combustible mixture comes more reliably into contact with the spark gap of the spark plug 6. In this case, the combustible mixture of nearly a cylindrical form starts burning from the central portion thereof. In this combustion, the central portion of the combustible mixture suddenly expands, and the peripheral portions of the combustible mixture easily disperse. When the combustible mixture has a relatively lean concentration, therefore, the flame poorly propagates to the peripheral portions resulting in a deteriorated combustion.

In the present embodiment, the vertical line MC about which the fuel is concentrated is separated away from the center line PC of the spark plug, so that the combustible mixture of nearly a cylindrical shape starts burning from the periphery thereof and the flame propagates nearly in the direction of diameter of the combustible mixture of nearly a cylindrical shape. Accordingly, the burned combustible mixture can expand to the side opposite to the unburned combustible mixture; i.e., the unburned combustible mixture is not dispersed, and the flame favorably propagates even when the combustible mixture has a relatively lean concentration. This contributes to further decreasing the consumption of fuel. In this embodiment, in particular, the vertical line MC for concentrating the fuel is separated away from the center line PC of the spark plug toward the fuel injection valve 7, and thus the burned combustible mixture is allowed to freely expand in a wide space in the cavity 8 on the side of the fuel injection valve 7, making it possible to reliably prevent the unburned combustible mixture from being dispersed.

Figure 4A:
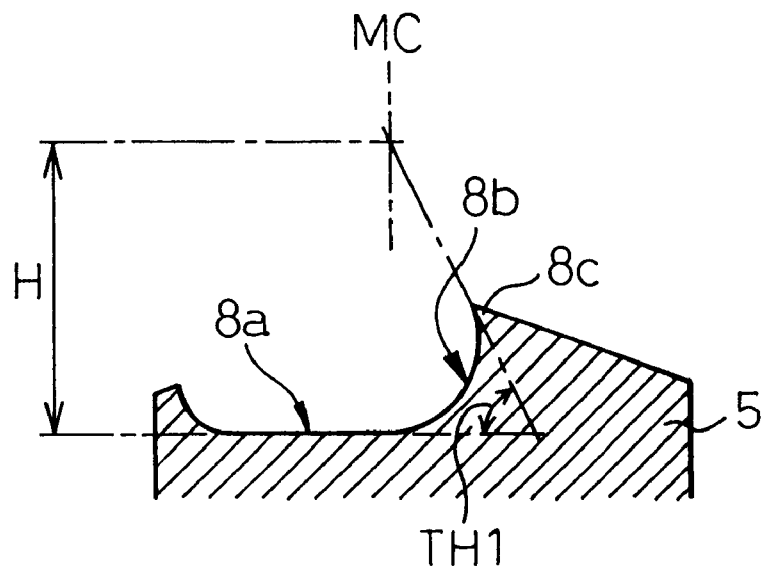
FIG. 4A is a sectional view of FIG. 2 along line A—A.
Figure 4B:
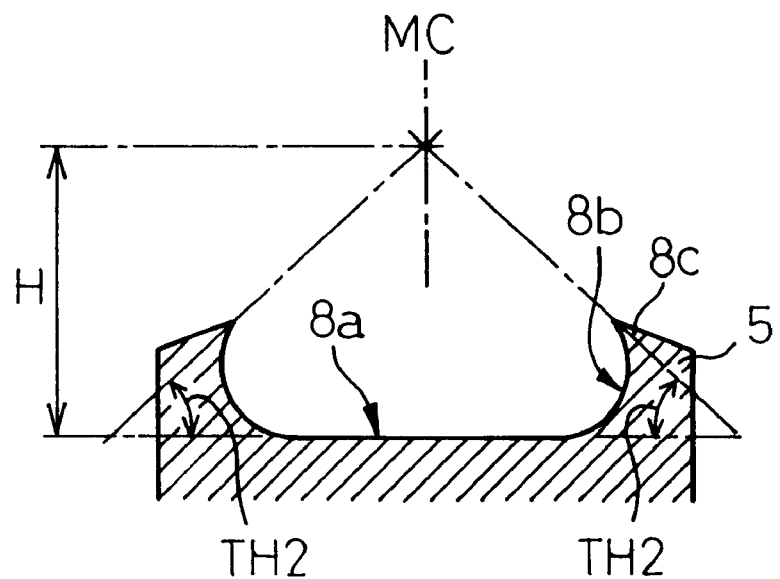
FIG. 4B is a sectional view of FIG. 2 along line B—B.

In the embodiment as shown in FIG. 4A which is a cross section of FIG. 2 along line A—A, further, the deflecting portion 8c at the center of the opposing side wall 8b has a first acute angle TH1 with respect to the horizontal plane. Referring to FIG. 4B, which is a cross section of FIG. 2 along line B—B, further, the deflecting portions 8c on both side portions of the opposing side wall 8b have a second acute angle TH2 smaller than the first acute angle TH1 with respect to the horizontal plane. In this embodiment, the bottom wall 8a of the cavity 8 is a horizontal surface which, however, does not restrict the present invention. The bottom wall 8a need not be necessarily constituted by a horizontal surface.

By constituting the deflecting portion 8c as described above, all parts of fuel can be brought onto the vertical line MC and approach each other in the direction of height. Thus, the combustible mixture can be more concentrated, and even a combustible mixture formed by injecting a further small amount of fuel can be reliably ignited and burned. This makes it possible to improve fuel consumption during, for example, idling.

Furthermore, the first acute angle TH1 and the second acute angle TH2 are suitably determined by taking into consideration the position of the vertical line MC and the shape of the opposing side wall 8b, and the acute angle of the deflecting portion 8c with respect to the horizontal plane is gradually changed, enabling the combustible mixture to be concentrated on the vertical line MC at nearly the same height (height H from the horizontal plane) and enabling the combustible mixture to be reliably ignited and burned even though the fuel is injected in a small amount.

Although the invention has been described with reference to specific embodiments thereof, it should be apparent that numerous modifications can be made thereto, by those skilled in the art, without departing from the basic concept and scope of the invention.

What is claimed is:

1. A direct fuel injection-type spark-ignition internal combustion engine comprising a spark plug, a cavity formed on the top surface of the piston, and a fuel injection valve for injecting fuel into said cavity in nearly a flat fan shape having a relatively small thickness, wherein an opposing side wall of said cavity opposite to said fuel injection valve, for leading said fuel to the vicinity of said spark plug, has an arcuate portion connecting the opposing side wall to a bottom wall and having a plurality of arcuate shapes in a plan view, the radius of the arcuate shapes at side parts of said arcuate portion in the plan view is smaller than the radius of the arcuate shapes at a center part of said arcuate portion in the plan view and said opposing side wall has a deflecting portion to deflect said fuel toward the inside of said cavity in a substantially synthesized velocity vector of the fuel.

2. A direct fuel injection-type spark-ignition internal combustion engine according to claim 1, wherein said deflecting portion has acute angles with respect to a horizontal plane formed of a bottom wall of the cavity and an acute angle of said deflecting portion positioned on the center part of said opposing side wall is larger than an acute angle of said deflecting portion positioned on the side parts of said opposing side wall of said arcuate portion.

3. A direct fuel injection-type spark ignition internal combustion engine according to claim 2, wherein the acute angle of said deflecting portion is gradually changed.

4. A direct fuel injection-type spark ignition internal combustion engine according to claim 1, wherein a center vertical line for concentrating said fuel is separated away from a center line of said spark plug.

5. A direct fuel injection-type spark ignition internal combustion engine according to claim 2, wherein the center vertical line for concentrating said fuel is separated away from the center line of said spark plug.

6. A direct fuel injection-type spark ignition internal combustion engine according to claim 3, wherein the center vertical line for concentrating said fuel is separated away from the center line of said spark plug.

7. A direct fuel injection-type spark ignition internal combustion engine according to claim 4, wherein said center vertical line for concentrating said fuel is separated away from said center line of said spark plug toward said fuel injection valve.

8. A direct fuel injection-type spark ignition internal combustion engine according to claim 5, wherein said center vertical line for concentrating said fuel is separated away from said center line of said spark plug toward said fuel injection valve.

9. A direct fuel injection-type spark ignition internal combustion engine according to claim 6, wherein said center vertical line for concentrating said fuel is separated away from said center line of said spark plug toward said fuel injection valve.

* * * * *